United States Patent

[11] 3,596,375

[72] Inventor Rene Hervieu
3 bis, rue Lamartine, Nantes, Loire-Atlantique, France
[21] Appl. No. 783,214
[22] Filed Dec. 12, 1968
[45] Patented Aug. 3, 1971

[54] APPARATUS FOR SIMULATING ON A SCREEN THE MOVEMENTS OF A SEA OR LAND CRAFT
11 Claims, 5 Drawing Figs.

[52] U.S. Cl. .......................................................... 35/12 N
[51] Int. Cl. .......................................................... B64g 7/00, G09b 9/08
[50] Field of Search .......................................... 35/12 N, 11, 25; 272/1, 16, 17, 18

[56] References Cited
UNITED STATES PATENTS

| | | | |
|---|---|---|---|
| 2,871,578 | 2/1959 | Faisandier | 35/25 X |
| 3,261,912 | 7/1966 | Hemstreet | 35/12 X |

Primary Examiner—Robert W. Michell
Assistant Examiner—L. R. Oremland
Attorney—Pierce, Scheffler & Parker ABSTRACT: This invention relates to apparatus for simulating the movements of a sea or land craft including a screen on which the route to be traveled by the craft is shown, a projector for projecting an image of the craft on the screen, which projector is mounted for angular rotation about two perpendicular axes to enable the image to be moved in two perpendicular directions on the screen and a drive mechanism controlled by the user of the apparatus or by the navigator or driver of the craft for effecting angular rotation of the projector about its axes in dependence on the simulated direction and speed of the craft.

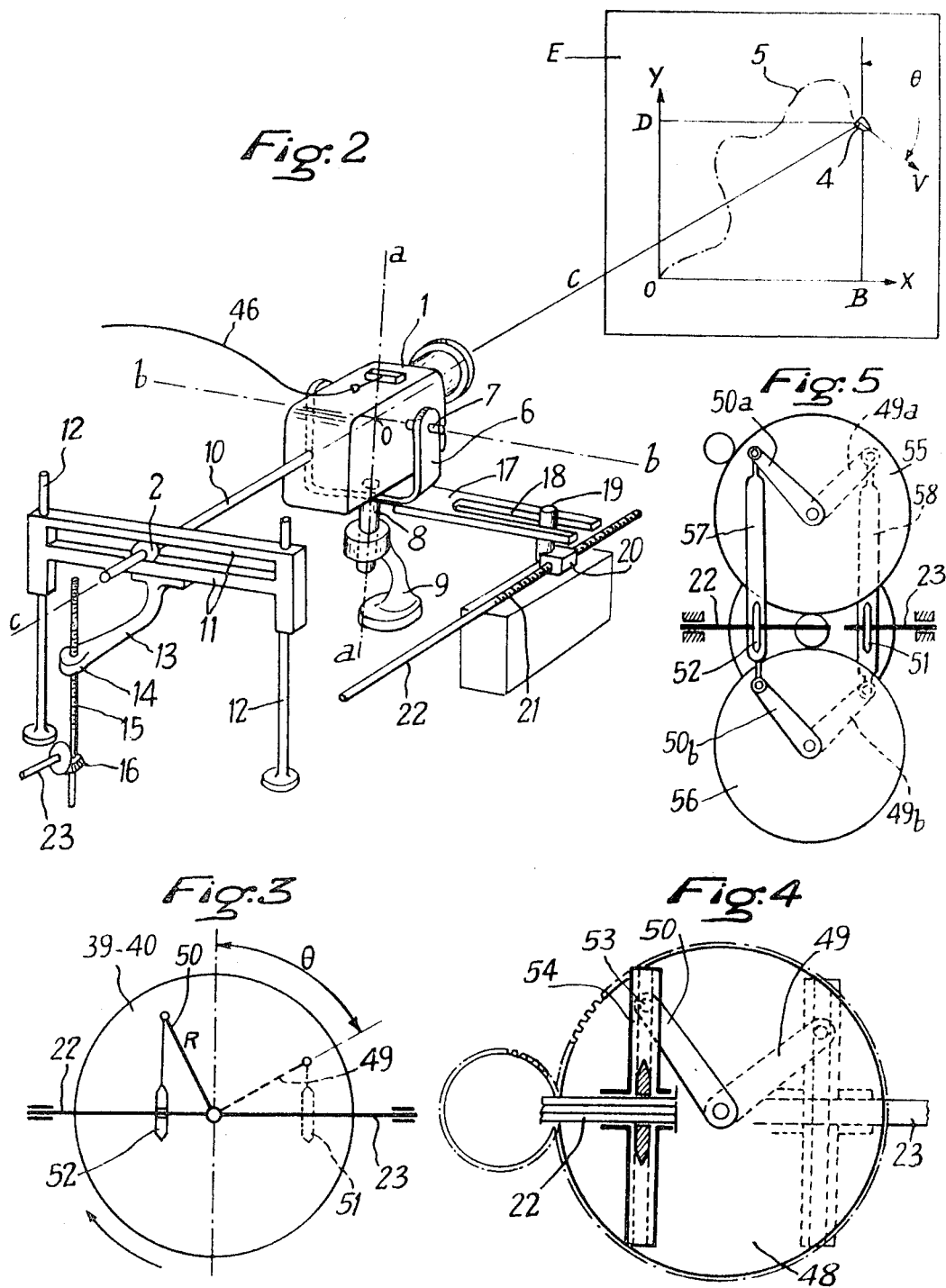

APPARATUS FOR SIMULATING ON A SCREEN THE MOVEMENTS OF A SEA OR LAND CRAFT

This invention relates to apparatus for simulating the movements of a sea vessel or land vehicle.

According to the invention, there is provided apparatus for simulating the movements of a sea or land craft, comprising a screen for showing the route to be travelled by the craft, a projector for projecting an image of the craft on the screen, means for mounting the projector for angular rotation about two perpendicular axes to enable the image to be moved in two perpendicular directions on the screen, and a drive mechanism for effecting angular rotation of the projector about its axes in dependence on the simulated direction and speed of the craft.

Features and advantages of the invention will be apparent from the following description of some embodiments thereof given, by way of example, in conjunction with the accompanying drawings, wherein:

FIG. 2 is a perspective view of a detail of the apparatus of FIG. 1;

FIG. 3 is a diagram showing the arrangement by which the movements of the wheels of the apparatus of FIG. 1 are combined;

FIG. 4 shows in practical detail the arrangement of FIG. 3; and

FIG. 5 is a modified form of the arrangement of FIG. 4.

Figure 1:
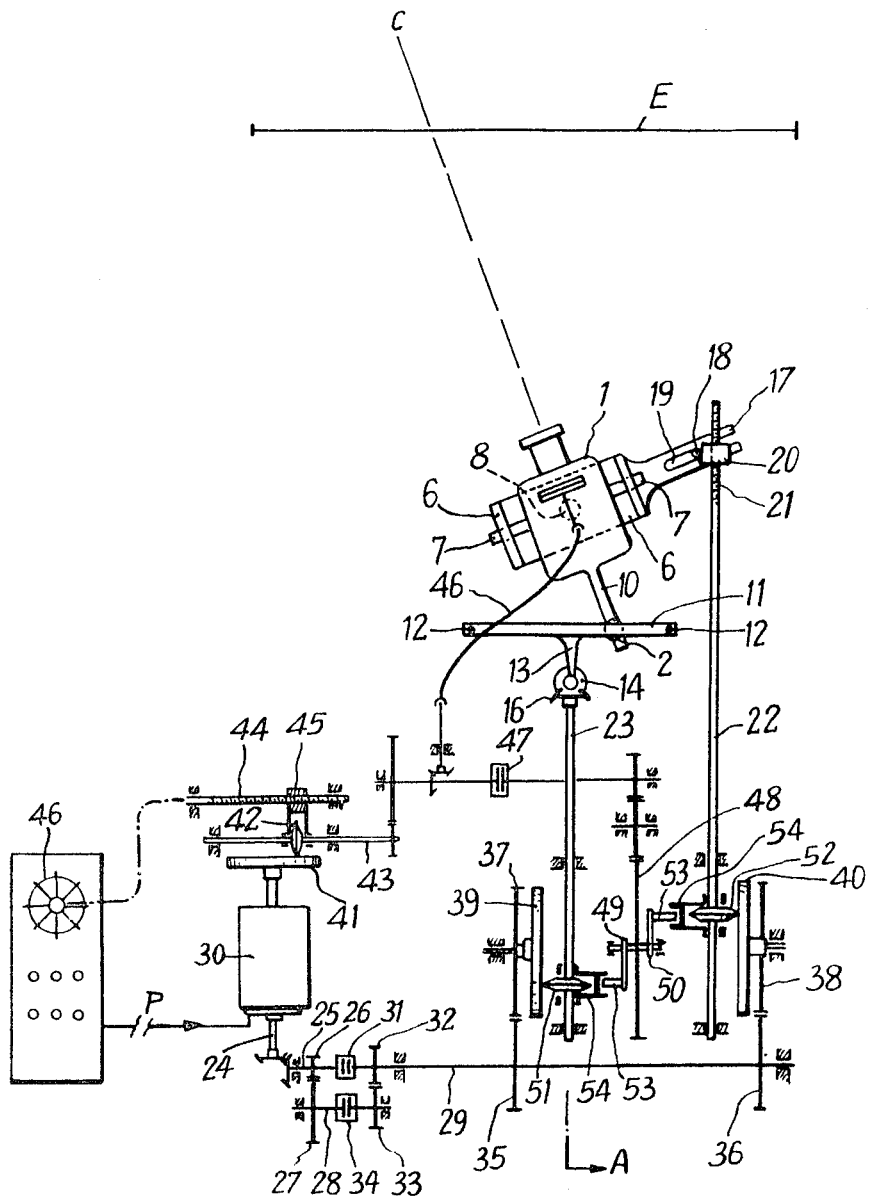
FIG. 1 is a diagrammatic plan view of apparatus according to the invention for training a person in the art of navigating a ship.

Referring to FIGS. 1 and 2, the apparatus generally includes a screen E for showing the route, for example the entrance to a channel marked by buoys, to be travelled by the ship, a projector 1 for projecting an image 4 of the ship on the screen, means for mounting the projector for angular rotation about two perpendicular axes $a-a$, $b-b$ to enable the image to be moved in two perpendicular directions on the screen E, and a drive mechanism for effecting angular rotation of the projector about its axes in dependence on the simulated direction and speed of the ship.

A rod 10 extending from the projector 1 along its axis of projection $c-c$, slidably carries a roller 2, defining a point on this axis, which is mechanically restrained by opposed guides 11 to move in a plane which in use of the apparatus would be disposed parallel to the plane of the screen E; in this manner, roller 2 will follow a path of shape identical to that traced by the image 4 on the screen. Axes $a-a$, $b-b$ and $c-c$ intersect at the same point 0 and axis $a-a$ is parallel to the screen.

Projector 1 is mounted by two trunnions 7 on a fork 6 whose foot 8 is pivotably mounted in a support 9. Axis $a-a$ is defined by the axis of foot 8 and axis $b-b$ by the axis of the two trunnions 7. The two guides 11 are slidably mounted on two vertical rods 12 disposed in a plane parallel to that defined by axes $a-a$ and $b-b$. Guides 11 are integral with a leg 13 whose end 14 is threaded and engages with a threaded rod 15 parallel to axis $a-a$. Rod 15 is mounted so that it can rotate, and is driven in rotation by a shaft 23 by means of bevel gears 16, whereby the projector 1 can be angularly rotated about its axis $b-b$. To angularly rotate the projector about its axis $a-a$, there is provided a leg 17, fixed to fork 6, having a mortise 18 in which is disposed a projection 19 supported by a threaded sliding member 20, which member 20 is driven in translatory motion by a threaded portion 21 of shaft 22 in engagement with member 20.

All the movements of projector 1 are effected by a single variable-speed motor 30 controlled by the user of the apparatus from a control P. The output shaft 24 of motor 30 drives a shaft 25 by means of bevel gears. Shaft 25 bears a gearwheel 26 which engages with a gearwheel 27 supported by a shaft 28. Shaft 25 drives a shaft 29 by means of a coupling 31. Shaft 29 supports a toothed gearwheel 32 which engages with a gearwheel 33, which can be connected to shaft 28 by a second coupling 34. When coupling 31 engages and coupling 34 is disconnected, shaft 29 is driven by motor 30 at a high speed. When coupling 31 is disconnected and coupling 34 engages, shaft 29 is driven slowly. Shaft 29 supports two gearwheels 35 and 36, which, respectively, drive gearwheels 37 and 38, which are integral with two identical discs 39 and 40 which rotate in the same direction and at the same speed in dependence on the speed V of the vessel.

Motor 30 also drives a plate 41 which drives by friction a wheel 42 which rotates a shaft 43. Wheel 42 can slide on shaft 43 (it is attached by a key or the shaft is square). A device comprising e.g. a screw 44 and nut 45 can stop the translatory movement of wheel 42 and hold the wheel at any point on a diameter of plate 41. Screw 44 is turned by a manually operable helm 46 at control P which effects simulated changes of direction of the ship.

Shaft 43 rotates an element mounted in projector 1 and providing the image 4. The element can, for example, be a circular transparency whose frame is surrounded by a toothed rim having a rotational axis coincident with the axis of projection and driven by a gearwheel driven by a flexible shaft 46 or system of sliding shafts connected by a cardan joint. Shaft 46 is directly or indirectly connected to shaft 43. Shaft 43 also drives a toothed wheel 48 by means of an electric coupling 47 and a bevel gear. A pair of arms 49 and 50, mounted on the shaft of wheel 48, are rotatable about the axis of the plates 39, 40 in dependence on the simulated changes of direction of movement of the ship; each arm 49, 50 at its end is linked respectively to wheels 51, 52 disposed on diametrically opposite sides of the axis of rotation of the plates 39, 40 and mounted for rolling movement on the surfaces thereof. The arms are secured together to form an angle of 90° therebetween, so that the distance of the orthogonal projections of the ends of the arms on to a common diameter of the plates from the center thereof depends for one wheel on the sine of the angle subtended by one arm relative to the diameter and for the other wheel on the cosine of the said angle.

Since wheels 39 and 40 rotate together in the same direction, at a speed V proportional to that of the vehicle, and since they drive wheels 51 and 52 the distance from the center of plates 39, 40 of which are respectively R sin $\theta$ and R cos $\theta$, R being the length of arms 49 and 50 and $\theta$ being the bearing angle determined by actuating means 46, it is clear that during the time $dt$, the two wheels 51 and 52 each rotate through an angle which is proportional, respectively, to V sin $\theta$ $dt$ and V $-$ cos $\theta$ $dt$.

In FIG. 4 each arm 49 and 50 has a trunnion 53 engaging in a guide 54 sliding on shaft 22 extending across a common diameter of the plates 39, 40, on which wheel 52 is mounted so that it can slide while rotating the shaft to effect angular rotation of the projector about its axis $a-a$; wheel 52 is held in guide 54 and is rotatable about an axis parallel to the direction of movement of the guide. Wheel 51, which is mounted in a similar manner, drives shaft 23 to effect angular rotation of the projector about its axis $b-b$.

FIG. 5 shows a modified form of mechanically coupling the movement of the two wheels 51 and 52. Wheel 48 is replaced by two wheels 55 and 56 rotating in the same direction about parallel axes and each having a pair of arms 49a—50a and 49b—50b. The parallel arms of said pairs are connected together by rods 57 and 58 supporting wheels 51 and 52 respectively.

In the example shown in FIGS. 1, 2, and 4, there are two identical discs 39 and 40 facing one another, but a single disc can of course be used for the two wheels 51 and 52. It is also obvious that the movement of the wheels can be transmitted to the projectors in a known manner by selsyn- or autosyn-type electric repeaters, stepping motors or other devices.

If the directional axis X and Y of the linear movements obtained as above are referred to screen E (FIG. 2), it can be seen that after time $t$, when the vehicle has moved from 0 to the position of image 4, the sliding member 20 has moved a distance proportional to the algebraic sum of the quantities V sin $\theta$ $dt$, and leg 13 has moved a distance proportional to the algebraic sum of the quantities V cos $\theta$ $dt$. The image 4 on the trajectory has the abscissa $\overline{OB} = \int \sin \theta \, \underline{dt}$ and the ordinate $\overline{OD} = \int \cos \theta \, \underline{dt}$. In other words, the image 4, at any instant, is moving at a speed corresponding in direction and amount to the speed and direction determined from control P, at any stage on the journey.

It is also seen that if coupling 47 and couplings 31 and 34 are disconnected, the element forming image 4 merely rotates in the same position (bearing $\theta$). The ship is then in the swinging position. If coupling 47 alone is disconnected for sufficient time, the axis of the element-forming image 4 is displaced with respect to its direction of movement. A drift of any amount at any time, accordingly, can be approximately simulated. The radius of turning movement of the ship simulated by plate 41 and wheel 42, is independent of the speed of the craft. If the speed V doubles, for example, the time taken to make a complete turn is halved, with the result that the same distance has to be travelled and the radius of turning is the same. It is also clear that the turning radius can be altered at the will of the user of the apparatus by helm 46. It is also clear, from the transmission facilities used, that when helm 46 is brought back to its equilibrium position (i.e. when wheel 42 is located at the rotational center of plate 41), arms 49 and 50 are motionless and the image 4 continues to move in a straight line in the previous direction of steering. This corresponds to the facts when a land or seacraft is driven.

The screws and nuts 14—15 and 20—21 (or a rack or other means of transforming rectilinear movements) enable the rectangular coordinates, and consequently the trajectory, to be exactly reproduced, since the projector angularly rotates about point 0. The trajectory, therefore, cannot be affected by the distortions commonly occurring in optics.

All the electric couplings are electrically actuated at a distance by a group of switches at the control P. In order to simplify the drawings, the last-mentioned detail has not been shown, since it will be obvious to those skilled in the art.

A number of apparatus such as that described above can be grouped together to project their images on a single screen, thus enabling a number of pupils to be trained simultaneously, and thus simulating heavy traffic.

In the case of a land craft or vehicle, the effects of a vehicle skidding can also be reproduced, by varying the pressure at which wheels 51 and 52 contact the discs 39—40.

Although the embodiment described is used for simulating the movements of a ship for teaching purposes, the apparatus can, for example, be used to simulate the movements of one or more motor vehicles.

Furthermore, the information transmitted from control P may, for example, be derived and transmitted from the bridge of an actual vessel entering a port, to a receiver on land, which information may then be transmitted to motor 30, shaft 44, etc. of the above-described apparatus to give the port commander on screen E a direct view of the movements of the vessel entering the port, the drift of the vessel being disregarded.

I claim:

1. Apparatus for reproducing the changing position of a simulated surface craft by projection of an image thereof on a screen comprising a screen onto which the image is projected, a projector for projecting an image of the craft on said screen, means for mounting said projector to rotate about two perpendicular axes, each being parallel to said screen so as to simulate direction of movement and speed of the image on said screen in any direction, means for rotating said projector selectively about at least one of said perpendicular axes, means for controlling the speed of and the extent of rotation of said rotation means in accordance with the speed and direction of and distance travelled by the simulated craft, said controlling means including at least one rotatable disc, means for controllably rotating said at least one disc at a speed corresponding to a selected speed of the craft, two spaced wheels on opposite sides of the center of said at least one disc, the peripheries of said wheels engaging the surface of said at least one disc, means for moving both of said wheels radially and simultaneously across the surface of said at least one disc in the same direction so as to vary the speed of rotation of said wheels inversely and means connecting each of said wheels to said means for rotating said projector about each of the perpendicular axes whereby the image projected on said screen follows a selected path at a selected speed.

2. Apparatus as claimed in claim 1 and further comprising means within said projector for forming the projected image of the craft and means for rotating the image-forming means about the axis of projection in accordance with the direction of the image as it moves across said screen.

3. Apparatus as claimed in claim 1 and further comprising a motor for driving said at least one disc, and means for selectively controlling the speed of said motor.

4. Apparatus as claimed in claim 1 and further comprising a motor, means connecting said motor to said two spaced wheels for moving said wheels radially across the surface of said at least one disc, means within said projector for forming the projected image of the craft, said connecting means also rotating the image-forming means within said projector about the axis of projection in accordance with the direction of the image as it moves across the screen.

5. Apparatus as claimed in claim 4 and further comprising means for controlling said connecting means in accordance with selected changes in direction of the projected image of the craft.

6. Apparatus as claimed in claim 4, and further comprising clutch means interposed between the motor and the spaced wheels whereby drift may be simulated even while the means for rotating the image-forming means is fully operable.

7. Apparatus as claimed in claim 1 wherein said controlling means includes two rotatable discs, rotating at the same speed and wherein the peripheries of each of said two spaced wheels engages one of said two discs.

8. Apparatus as claimed in claim 1, wherein the means for moving said two spaced wheels comprises two arms connected together at one end to form a 90° angle, two guide members slidably connected to the other ends of said arms, said spaced wheels being rotatably mounted on said guide members, whereby upon rotation of said connected arms about their junction, said guide members and said wheels will be moved across a diameter of said at least one disc.

9. Apparatus as claimed in claim 1, wherein the means for moving said two spaced wheels comprises two pairs of arms, each pair being connected together at one end to form a 90° angle and rotatable about parallel axes, two guide members, each being connected to the other end of each of said pair of arms, each of said spaced wheels being rotatably mounted on one of said guide member, whereby upon rotation of said pairs of arms said guide members and said wheels will be moved across a diameter of said at least one disc.

10. Apparatus as claimed in claim 1 and further comprising means for varying the pressure of the spaced wheels against said at least one disc.

11. Apparatus as claimed in claim 1 and further comprising means for receiving signals from a craft indicating its movement and location and means for controlling said controlling means in accordance therewith.